United States Patent
Seki

[19]
[11] Patent Number: 6,016,056
[45] Date of Patent: Jan. 18, 2000

[54] MEASUREMENT OF DISPLACEMENT AND SPEED IN AN INJECTION MOLDING MACHINE

[75] Inventor: Mitsunori Seki, Aichi, Japan

[73] Assignee: Kabushiki Kaisha Meiki Seisakusho, Aichi-Ken, Japan

[21] Appl. No.: 09/004,859

[22] Filed: Jan. 9, 1998

[30] Foreign Application Priority Data

Jan. 14, 1997 [JP] Japan ................................. 9-017478

[51] Int. Cl.⁷ .............................. G01P 3/52; G01P 13/00; B29C 45/76
[52] U.S. Cl. ........................ 324/165; 324/166; 324/175; 264/40.1
[58] Field of Search .................................. 324/165, 166, 324/168, 173, 174, 175, 226, 233, 207.23; 264/40.1, 40.5, 40.7; 425/135, 150; 92/5 R; 340/672; 250/231.13, 231.16

[56] References Cited

U.S. PATENT DOCUMENTS 4,811,254 3/1989 Iijima et al. ................................ 341/6

FOREIGN PATENT DOCUMENTS 5-220802 8/1993 Japan .

Primary Examiner—Walter E. Snow
Attorney, Agent, or Firm—Browdy and Neimark

[57] ABSTRACT

A device for detecting motion of a movable part of an injection-molding machine uses an encoder coupled to the part which outputs two square waves which are a quarter-cycle out of phase. The two waves are used to generate trigger pulses at four times either encoder waves' frequency. The direction of the phase shift, positive or negative, depends on the forward or backward direction of motion of the part, and the trigger pulses are generated in on one of two logic circuits depending on the direction of motion of the part. The quadrupling of the encoder wave frequency increases the accuracy of motion measurement. The device uses AND/OR logic to generate the two sets of trigger pulses. The trigger pulses are counted to determine the distance the part has moved. The trigger pulses are also latched, and higher-frequency clock pulses are counted during the latched period to calculate the part's speed.

10 Claims, 8 Drawing Sheets

MEASUREMENT OF DISPLACEMENT AND SPEED IN AN INJECTION MOLDING MACHINE

FIELD OF THE INVENTION

The present invention relates to a device for detecting the displacement and speed of moving parts such as an injection screw (plunger) and movable platen of an injection molding machine, and more particularly relates to a detecting device capable of accurately measuring their displacement and of stably and accurately measuring their speed.

DESCRIPTION OF RELATED TECHNOLOGY

The invention of Toku Kai Hei 5-220802 discloses a method of detecting the speed and displacement of an injection screw in an injection molding machine by a rotary encoder, wherein the speed is detected by a device that counts basic clock numbers, which a basic clock generates during a pulse of the encoder. That is, $V=(CLK/N) L$, wherein V designates the speed of the injection screw, CLK designates the frequency of the basic clock, N designates the basic clock numbers, and L designates a distance the injection screw runs during a pulse output from the encoder. The displacement of the injection screw is directly detected by the pulse output from the encoder.

However when an encoder plate with an incorrect slit interval is used, or the center of an axis of a circular slit is eccentric the encoder generates pulses with incorrect interval. This makes accurate speed or displacement control of the injection screw impossible, even if pulses of the encoder are subdivided.

SUMMARY OF THE INVENTION

In light of the above-mentioned problems, it is an object of the present invention to provide a novel detecting device of displacement and speed of the movable parts in a injection molding machine by which an accurate control of the speed and displacement in injection molding is implemented despite incorrect interval pulses generated by the encoder.

It is another object of the present invention to provide a novel detecting device of displacement and speed of the movable parts in a injection molding machine by which the pulses generated by an encoder are converged into trigger pulses or latched pulses by logic circuits.

It is another object of the present invention to provide a novel detecting device of displacement and speed of the movable parts in a injection molding machine by which the trigger pulses are subdivided for detecting the displacement of the movable parts.

BRIEF DESCRIPTION OF THE DRAWING FIGURES

The above and other objects and the nature and advantages of the present invention will become more apparent from the following detailed description of an embodiment taken in conjunction with drawings, wherein.

DETAILED DESCRIPTION OF THE PREFERRED EMBODIMENT

This invention will be described in further details by way of example with reference to the accompanying drawings.

Figure 1:
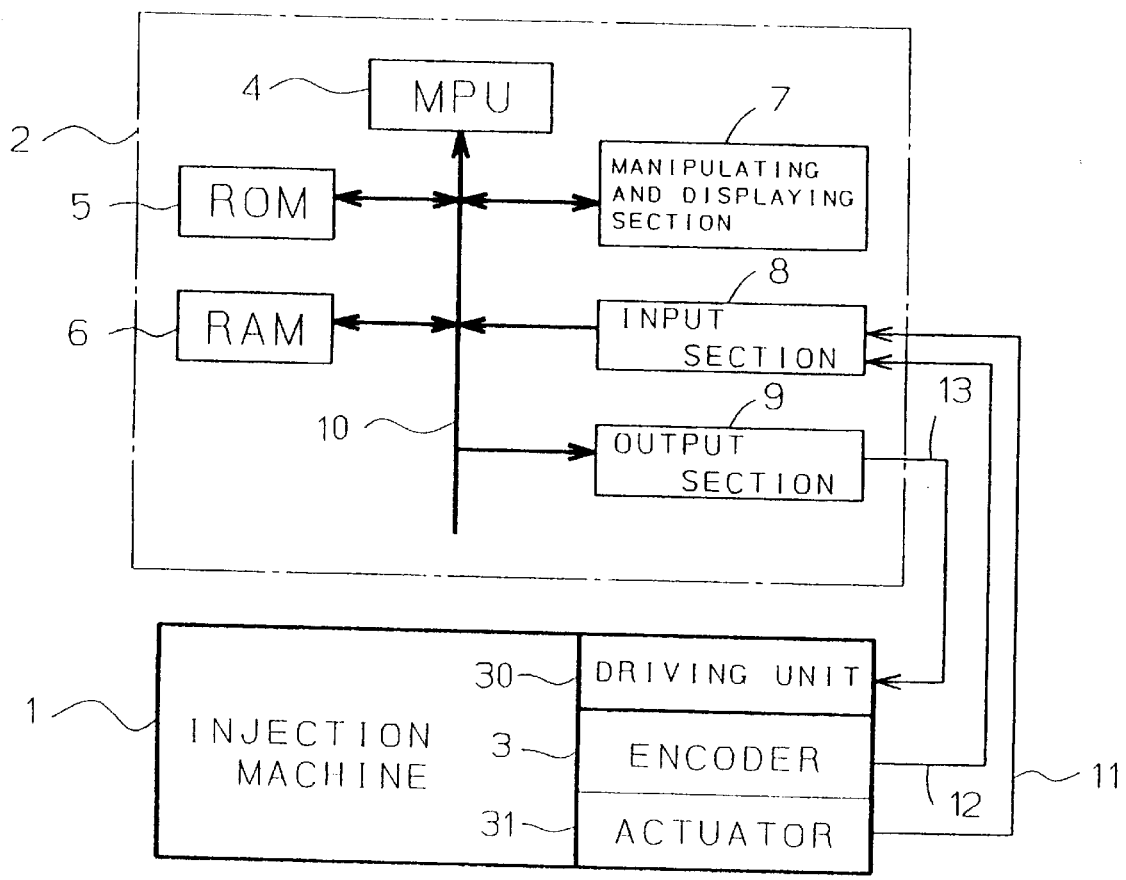
FIG. 1 is a block diagram of the detecting device of displacement and speed.

FIG. 1 shows a block diagram referring to a control device 2 according to the present invention in an injection molding machine 1.

The injection molding machine 1 includes actuators 31, for example a clamping cylinder, or an injection cylinder, and driving units 30 such as hydraulic pressure units and electric motors for actuating the actuators 31. The driving unit 30 is operated by command signal 13 from an output section 9 of the control device 2. The control device 2 includes a micro processor unit 4 (hereinafter referred to as MPU); a ROM 5 for storing control programs and various data; a RAM 6 for brief storage of detected data and numerical values during calculating; a "manipulating" and displaying section 7 for setting injection molding conditions like injection speed, the screw position at which an injection speed or injection pressure is changed, the temperature of the heating barrel and nozzle, for operating the injection molding machine, and for displaying preset or detected numerical values of injection control conditions; an input section 8 for inputting encoder signals 12 from encoders (or, pulse generator) 3 for detecting the displacement of movable parts like the injection screw or the clamping ram, or a revolution speed of the injection screw; temperature thermosensors in the heating barrel and the mold; and an output section 9 for outputting control signals 13 to the actuators 31. Each device is connected to the MPU 4 by a busline 10.

Figure 2:
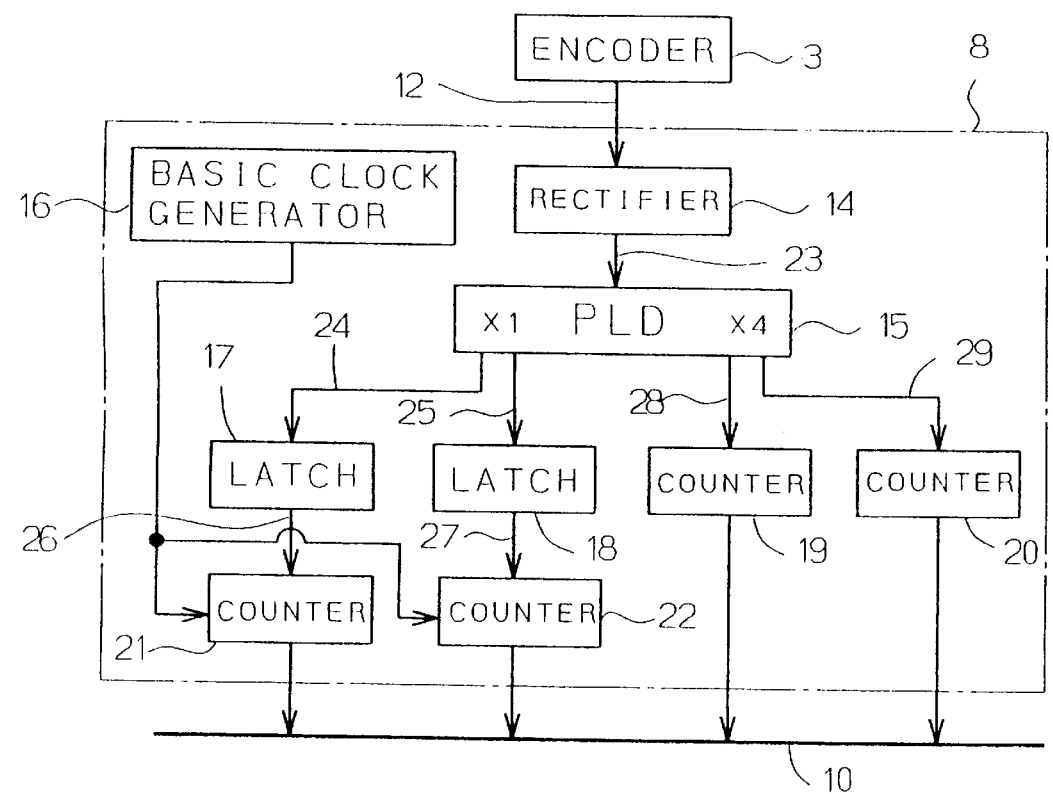
FIG. 2 is a block diagram of an input section shown in FIG. 1 for inputting and calculating encoder signals from the encoder.

FIG. 2 shows a detail block diagram of the input section 8. While the actuators 31 are actuated, the encoders 3 output encoder signals 12 comprising two waves with an A phase pulse wave and a B phase pulse wave. These two phase pulse waves have equal periods but differ in phase by a quarter cycle, as seen in the two uppermost signal lines of FIGS. 3–6. The relative phase shift depends on the direction of motion.

Figure 8:
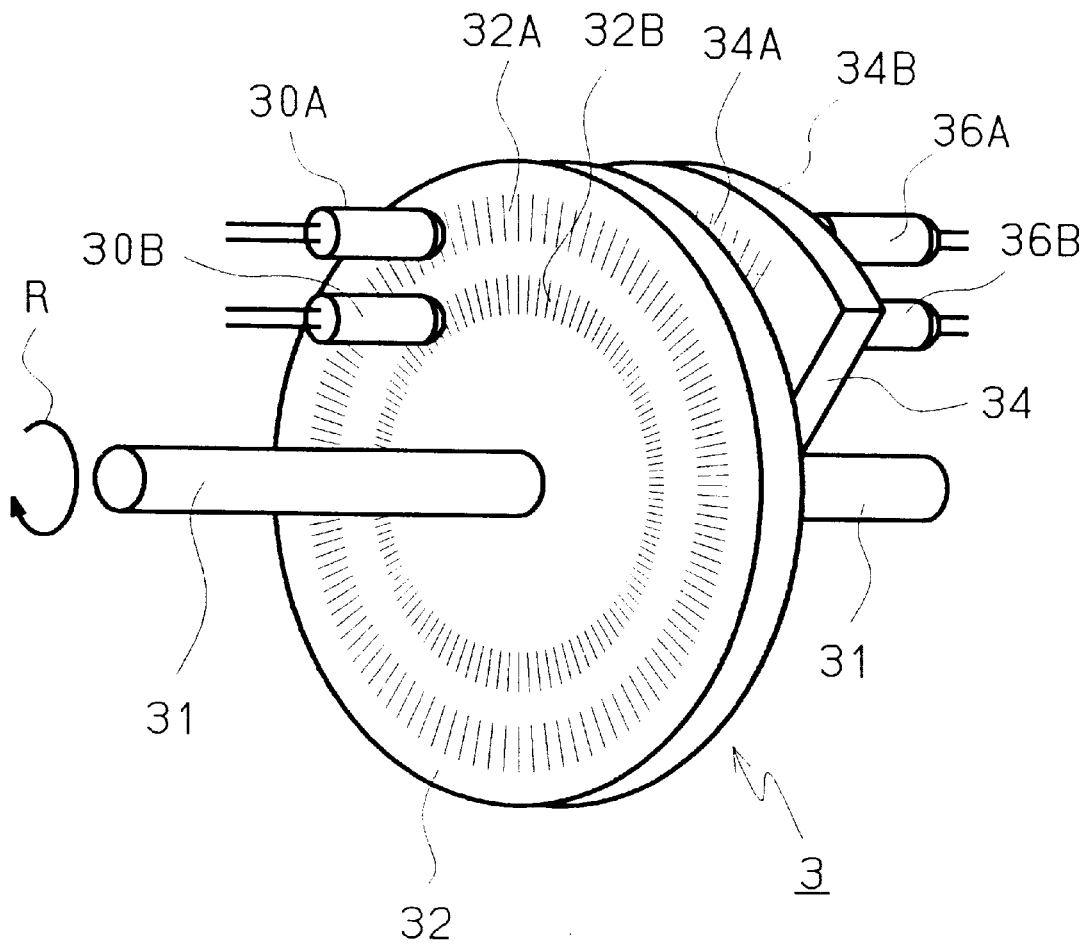
FIG. 8 is a schematic illustration of a typical encoder.

FIG. 8 shows a typical encoder 3 comprising a rotatable shaft 31 turning in a positive direction indicated by arrow R. Mounted on the shaft 31 is a movable encoder plate or disc 32 with two annular bands of slits 32A and 32B, and a fixed encoder plate or disc 34 with annular bands of slits 34A and 34B (behind encoder disc 32 in FIG. 8 and not visible). Lamps 30A and 30B and photo-sensors 36A and 36B are deployed as shown: lamp 30A shines through slits 32A and 34A into photo-sensor 36A, while lamp 30B shines through slits 32B and 34B into photo-sensor 36B. Lamp 30A and the A-phase photo-sensor 36A are aligned, having the same radial distance from the shaft rotation axis and the same circumferential placement (by angle about the rotation axis); the lower lamp and the B-phase photo-sensor are similarly aligned with one another.

The movable and fixed encoder plates are closely adjacent along the shaft axis, and the slits are aligned (band 32A aligned with band 34A, band 32B aligned with band 34B) so that the A-phase sensor 36A picks up light only from lamp 30A and the B-phase lamp 36B picks up light only from lamp 30B; that is, light cannot pass through an outer-band slit to an inner-band slit, or conversely.

The slits 34A and 343 in the fixed encoder disc 34 do not extend circumferentially along the entire arc of the fixed encoder plate and the plate itself extends only partially around the circumference instead around a full circle, as the movable plate disc 32 does. The reason is that the lamps and photo-sensors have emitting and receiving areas which are wider in the circumferential direction than the slits. Light passes from a lamp to a photo-sensor through a number of slits simultaneously.

In either one of the fixed or the movable encoder plates 32, 34 the slits of the inner and the outer A- and B-bands are offset in the circumferential direction by a quarter of the distance between corresponding slit edges. This produces the 90-degree phase offset seen in upper portions of the drawing FIGS. 3–7, so that rotation of the encoder 3 generates two signals of A-phase and B-phase. A forward movement of a movable part of the molding machine (corresponding to rotation in, e.g., the direction of the arrow R, depending on the mechanical details) causes the encoder 3 to generate the A pulse wave preceding B pulse wave, Conversely, reverse movement causes it to generate the B pulse wave preceding A pulse wave. Hereinafter the rotation of the encoder 3 due to a forward movement of the movable part is referred to as "positive" rotation and that due to a reverse movement is referred to as "negative" rotation.

The encoder 3 shown in FIG. 8 is exemplary; rotary encoders are available to be bought "off-the-shelf" in various configurations, and any configuration can be used. For example, one embodiment useful in the invention (not shown) is like that of FIG. 8 but uses a specialized encoder plate, two photo-sensors but only one lamp, and no inner band of slits on the movable disc 32.

Another embodiment (not shown) uses a rotary disc having only a few wide slots per disc, for example, four slots equally spaced circumferentially, separated by equal light-blocking arcuate segments. These can be used with a narrow beam, e.g. a laser beam, aimed through onto a photo-detector. Such encoders can generate the type of signals seen at the top of FIGS. 3–6, "square waves", without any rectification because the laser beam is left unimpeded for an interval while shining through the slit, and then is cut off abruptly by the edge of the light-blocking segment, producing a signal with vertical ramps. The two phases can be made using two coupled discs with respective lasers and detectors, or one disc with properly placed lasers and detectors for A-phase and B-phase signals respectively.

In the illustrated embodiment so the encoder 3 shown in FIG. 8, the output from the sensors has sloped rising and falling edges. Since a wide beam of light is passed through a set of overlapping narrow slits by the encoder 3 of FIG. 8, the light to the photo-sensor is not cut off or turned on abruptly, and the signal output directly from either photo-sensor has sloped rising and falling sides instead of sharply vertical sides. A wave rectifier section 14 (FIG. 2) is provided which both rectifies the wave shape (i.e., turns the signal into a "square wave") and eliminates noises in the encoder signals 12. Then the two phase wave signals 23, with A phase pulse wave and B phase pulse wave, are output into a programmable logic device (PLD) 15, which is a pulse treatment section.

FIG. 2 shows that the programmable logic device 15 includes a programmable logic section with logic circuits for generating trigger pulses. In the preferred embodiment of the present invention, the programmable logic device 15 includes, first, a positive programmable logic section for generating trigger pulses with logic circuits only while the encoder 3 is positively rotating and, second, a negative programmable logic section for generating trigger pulses with logic circuits only while the encoder 3 is negatively rotating.

In the pulse waves shown in FIG. 3, FIG. 4, FIG. 5, FIG. 6, FIG. 7, the vertical axis designates information numerals (or, information states or bits), that is, "1" designates that the voltage level is high and "0" designates that the voltage level is low. The horizontal axis designates lapse of time.

Figure 3:
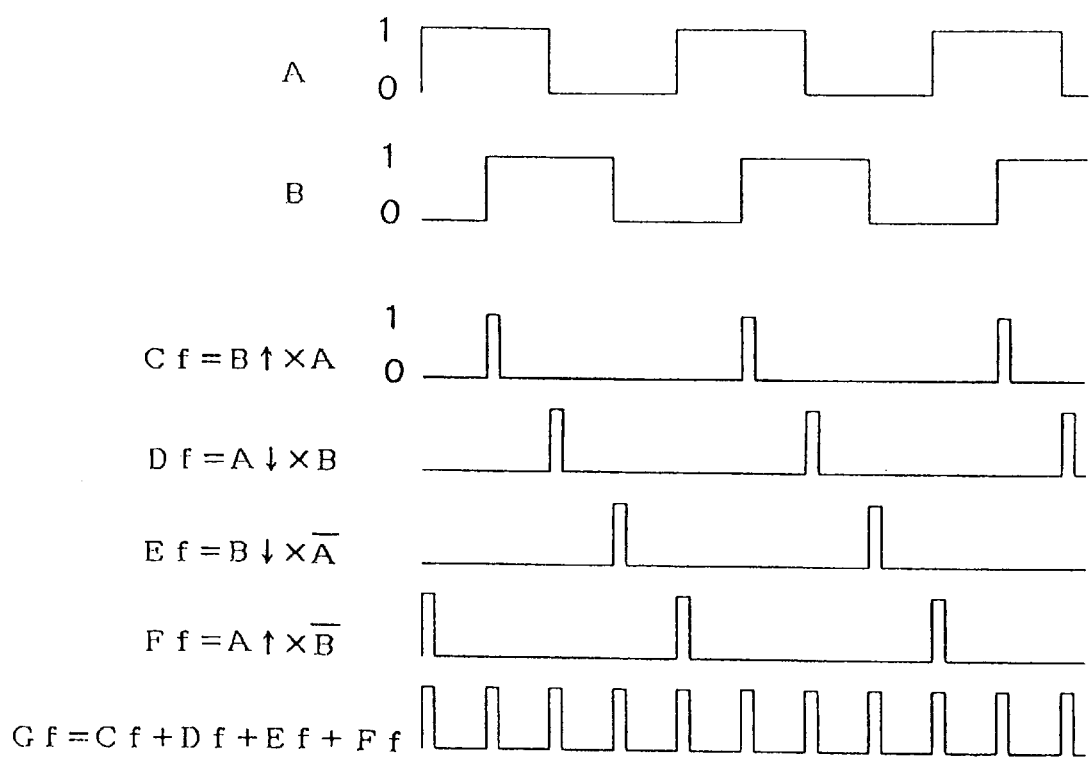
FIG. 3 is a time chart of the pulses which a positive programmable logic section in a programmable logic device generates during the positive revolution of the encoder.
Figure 4:
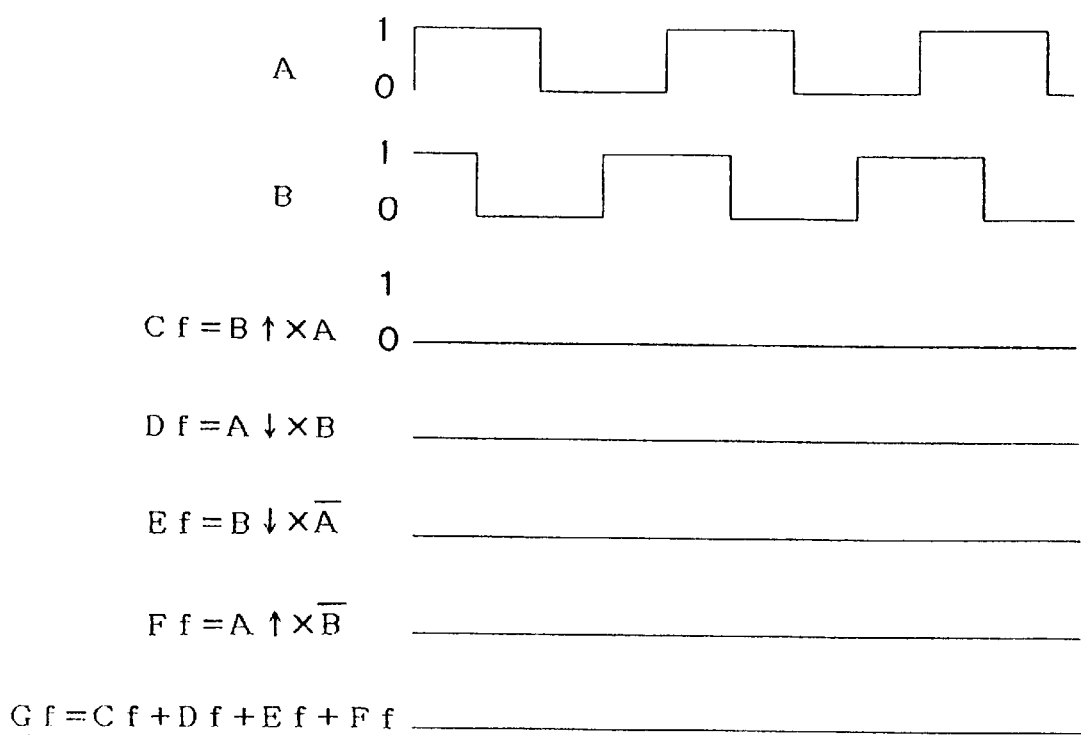
FIG. 4 is a time chart of the pulses which a negative programmable logic section in a programmable logic device generates during the negative revolution of the encoder.
Figure 5:
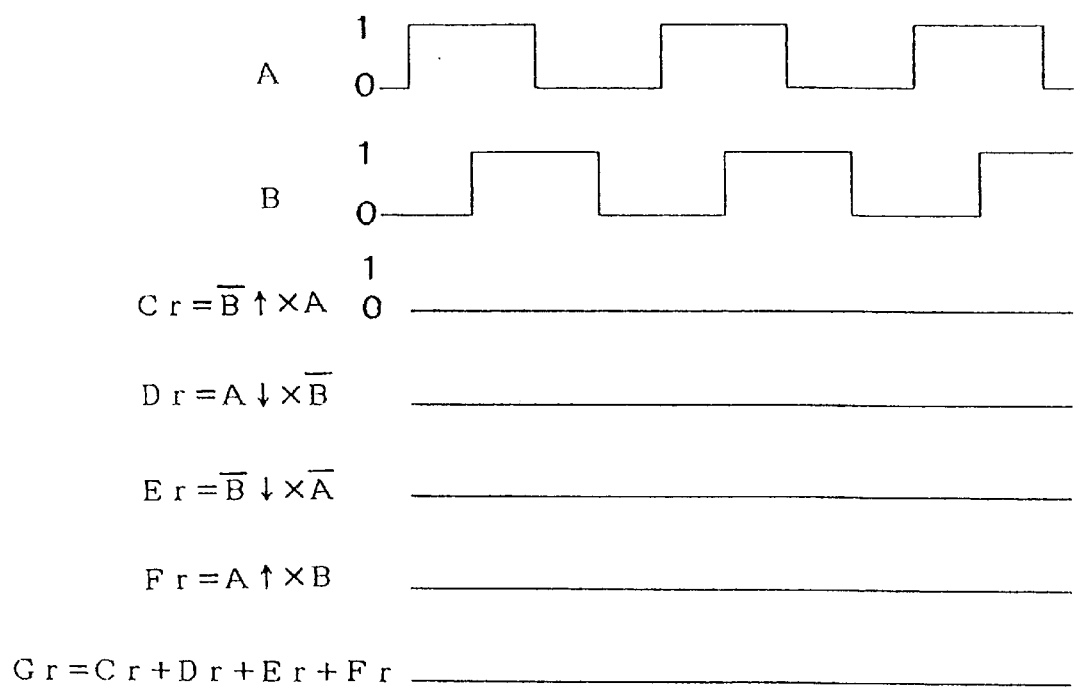
FIG. 5 is a time chart of the pulses which a negative programmable logic section in a programmable logic device generates during the positive revolution of the encoder.
Figure 6:
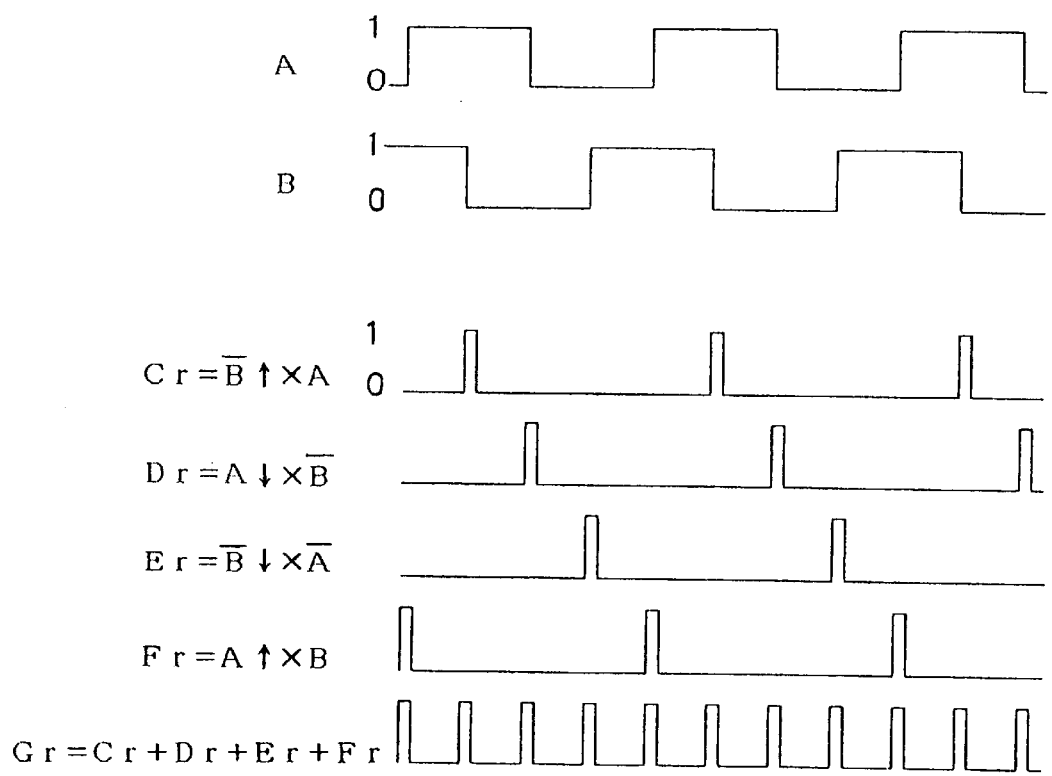
FIG. 6 is a time chart of the pulses which a negative programmable logic section in a programmable logic device generates during the negative revolution of the encoder.

FIG. 3 and FIG. 4 relate to the operation of the positive programmable logic section of the programmable logic device 15. The input, shown at the top, is the two pulses waves, of A phase and B phase, which are generated during positive or negative rotation of the encoder 3. FIGS. 3 and 5 show the results of positive rotation and FIGS. 4 and 6 show the results of negative rotation; FIGS. 3 and 4 relate to the positive programmable logic section while FIGS. 5 and 6 relate to the negative programmable logic section.

FIG. 3 shows the trigger pulses Cf are generated according to an AND logic equation $Cf = B\uparrow \cdot A$ wherein $B\uparrow$ has the logical value 1 at the leading edges of the B phase pulse wave (edges with voltage rising) and A designates that the A phase pulse wave has logic state=1 (information numeral 1) at the time of the B pulse wave's voltage rise.

Likewise, the trigger pulses Df are generated according to an AND logic equation $Df = A\downarrow \cdot B$ wherein $A\downarrow$ has the logical value 1 at the trailing edges of the A phase pulse wave (voltage falling) and B designates that the B phase pulse wave has logic state=1 (information numeral 1) at the time of the A pulse wave's voltage fall.

The trigger pulses Ef are generated according to an AND logic equation $Ef = B\downarrow \cdot \overline{A}$, where boldface denotes the over-bar used in the drawing. In this equation $B\downarrow$ has the logical value 1 at the trailing edges of the B phase pulse wave (edges with voltage falling) and $\overline{A}$ designates that the A phase pulse wave has logic state=0 (information numeral 0) at the time of the B pulse wave's voltage fall.

The trigger pulses Ff are generated according to an AND logic equation $Ff = A\uparrow \cdot \overline{B}$, wherein $A\uparrow$ has the logical value 1 at the leading edges of the A phase pulse wave (edges with voltage rising) and $\overline{B}$ designates that the B phase pulse wave has logic state=0 (information numeral 0) at the time of the A pulse wave's voltage rise.

Trigger pulses Gf having four times the pulse frequency of encoder 3 in a cycle are generated by the OR logic equation $Gf = Cf + Df + Ef + Ff$ when the encoder 3 rotates in the positive direction.

FIG. 4 shows two pulses waves, of the A phase and the B phase, which are generated during negative rotation of the encoder 3. The phase is shifted by 180 degrees relative to waves of FIG. 3, so that the B wave leads the A wave instead of the opposite. The logic equations $Cf = B\uparrow \cdot A$, $Df = A\downarrow \cdot B$, $Ef = B\downarrow \cdot \overline{A}$, and $Ff = A\uparrow \cdot \overline{B}$ generate no pulses Cf, Df, Ef, and Ff and all the information numerals of the logic equations Cf, Df, Ef, Ff, and Gf become zero. As a result, no pulses are generated in the positive programmable logic section.

FIG. 5 and FIG. 6 related to the negative programmable logic section.

FIG. 5 shows pulse waves during positive rotation of the encoder 3. All the information numerals calculated by the logic equations Cr=B↑·A, Dr=A↓·B, Er=B↓·A, and Fr=A↑·B are zero and therefore Gr=Cr+Dr+Er+Fr becomes zero. As a result, no pulses are generated in the negative programmable logic section during positive rotation.

FIG. 6 shows two pulses waves of A phase and B phase which are generated during negative rotation of the encoder 3. The trigger pulses Cr are generated according to an AND logic equation Cr=B↑·A, wherein B↑ has the logical value 1 at the trailing edges of the B phase pulse wave (edges with voltage falling) and A designates that the A phase pulse wave has logic state=1 (information numeral 1) at the time of the B pulse wave's voltage fall.

Likewise, the trigger pulses Dr are generated according to an AND logic equation Dr=A↓·B wherein A↓ has the logical value 1 at the trailing edges of the A phase pulse wave (voltage falling) and B designates that the B phase pulse wave has logic state=0 (information numeral 0) at the time of the A pulse wave's voltage fall.

The trigger pulses Er are generated according to an AND logic equation Er=B↓·A, wherein B↓ has the logical value 1 at the leading edges of the B phase pulse wave (edges with voltage rising) and A designates that the A phase pulse wave has logic state=0 (information numeral 0) at the time of the B pulse wave's voltage rise.

The trigger pulses Fr are generated according to an AND logic equation Fr=A↑·B, wherein A↑ has the logical value 1 at the leading edges of the A phase pulse wave (edges with voltage rising) and B designates that the B phase pulse wave has logic state=1 (information numeral 1) at the time of the A pulse wave's voltage rise.

Trigger pulses Gr having four times the pulse frequency of encoder 3 in a cycle are generated by the OR logic equation Gr=Cr+Dr+Er+Fr when the encoder 3 rotates in the negative direction.

Any of the trigger pulses Cf, Df, Ef, and Ff generated in the positive programmable logic section is transmitted as a positive directional signal 24 of the encoder's rotation to the first latch 17. Any of the trigger pulses Cr, Dr, Er, and Fr generated in the negative programmable logic section is transmitted as a negative directional signal 25 of the encoder's rotation to the 2nd latch 18.

Figure 7:
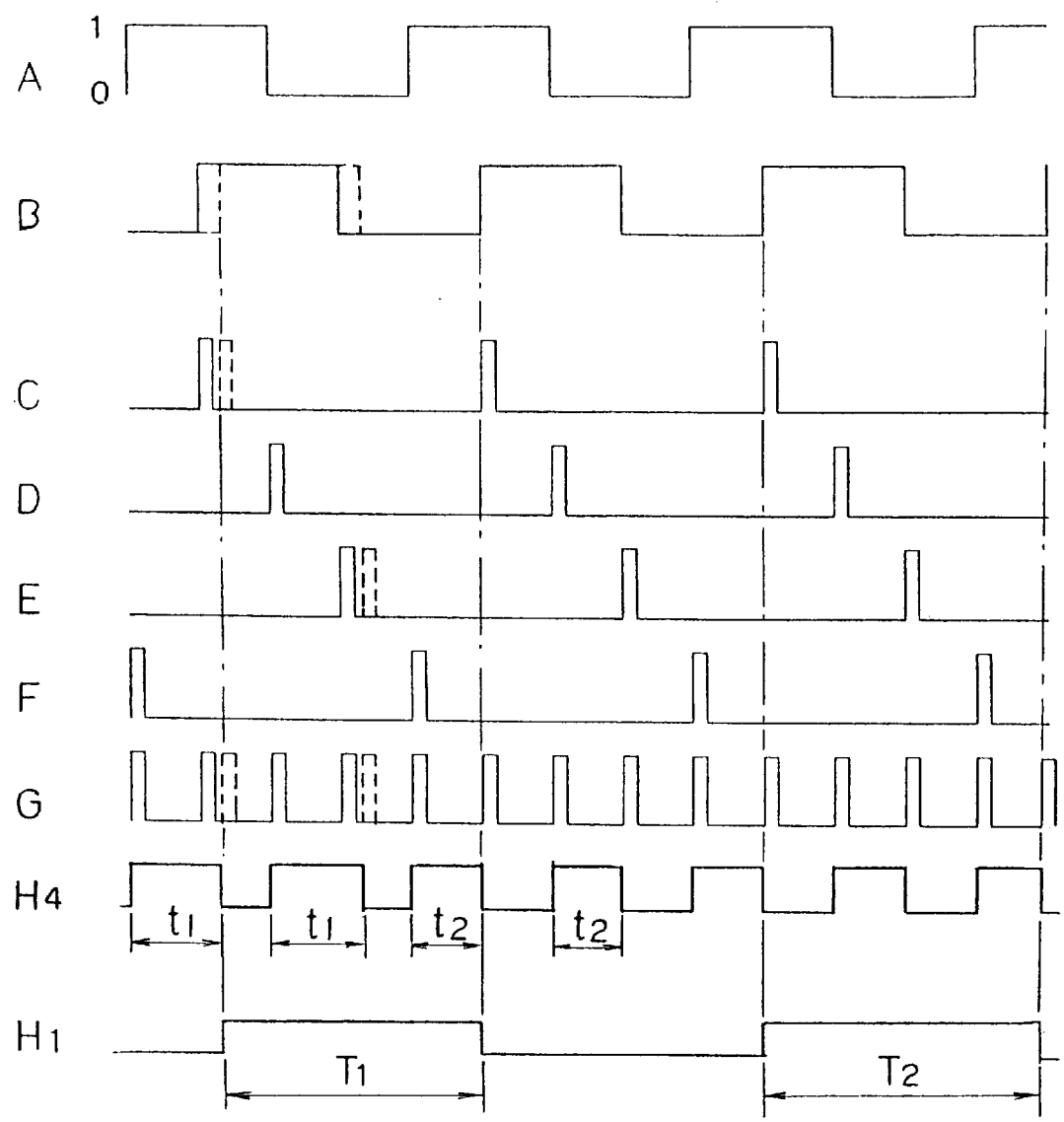
FIG. 7 is a time chart of the triggered and latched pulses of the encoder pulses.

A gate pulse wave H1, shown in FIG. 7, is generated by the trigger pulse Cf being latched by the first latch 17, causing the voltage level of H1 to be altered at every leading (rising) edge of the trigger pulse Cf. A signal like H1 can likewise be generated by the trigger pulse Cr, latched by the second latch 18, from the negative programmable logic section. The trigger pulses Cf and Cr are not simultaneous since they are generated by opposite motions.

As noted above, there may be errors due to the encoder plate having incorrect slit width or being eccentric. Such an erratic pulse is indicated by in FIG. 7. The dotted line shows a pulse generated by the error of a pulse interval of the B phase pulse wave.

The gate pulse 26 of the H1 pulse wave (which is output from the first latch 17) and gate pulse 27 of the H1 pulse wave (which is output from the second latch 18), shown in FIG. 7, are input into a first counter 21 and a second counter 22 respectively. Basic clock pulses, generated by a basic clock pulse generator 16, are also input into the first counter 21 and the second counter 22.

Both the first counter 21 and the second counter 22 count the base (basic) clock pulses only while the gate pulse 26 or 27 is kept at high voltage level "1". The number of the base clock pulse count is transmitted through the busline 10 to the MPU 4. The MPU measures the time that the gate pulse 26 or 27 was kept in high voltage level 1 in order to calculate the speed of a movable part according to the displacement of the movable part per clock pulse, which has been stored by the ROM 5.

In the MPU the speed of a movable part is determined by the data sampling with predetermined repeat. The frequency of the base clock pulses are preferably chosen in consideration of the speed of a movable part, for example, the basic clock pulses might have a frequency of 1 MHz at speeds of 3–18 m/sec and the basic clock pulses might have a frequency of 100 KHz at the speeds 0.3–1.8 m/sec.

The MPU 4 discriminates the direction of the movement of a movable part by which counter outputs a signal, that is, the first counter 21 or the second counter 22.

When the movable part has stopped or has slowed down either on advance or reverse, the first counter 21 and the second counter 22 can not finish their counting to make the renewal of data in MPU 4 impossible, resulting in the state that the speed signal value in MPU 4 keeps a signal value just before the movable part stops. In such case, MPU 4 commands the first counter 21 and the second counter 22 to reset the value of speed to zero.

That is, the encoder 3 might be stopped, by chance, at a position where the gate pulse 26 or 27 is maintained at the high state "1", so that the pulses from the basic clock generator 16 continue to be counted by the counters 21 and 22. This will cause the speed to be wrongly calculated as very high; the counters are reset to zero if this happens.

The trigger pulses Gf and Gr are transmitted to the third counter 19 and the fourth counter 20 respectively, whence the counted numbers of pulses are transmitted through the busline 10 to the MPU 4, which detects the position of the moving actuators 31 by calculating balance of numbers counted respectively by the third counter 19 and the fourth counter 20. Thus, even if the advancing movable part is forced to pull back by any troubles, its distance of advance can be measured correctly.

In the present invention measurement of the speed and position of the movable part is based on the gate pulse H1 and on the trigger pulses Gf (Gr) respectively. Most of pulse interval errors generated by the encoder 3 result from incorrect slit width or an eccentric center of an axis of the circular slit plate in the encoder. When the pulse with an incorrect interval, shown by a dotted line in FIG. 7, is produced in the B phase pulse wave (for example, by incorrect width and/or eccentricity), a pulse with an incorrect interval (shown with a dotted line) is produced in the trigger pulse wave Cf as well, resulting in generation of an incorrect internal $T_1$ in the gate pulse H1.

However, $T_2$ of the gate pulse H1 designates a correct interval of the pulse, indicated by lack of dotted lines. This could come about, for example, because $T_2$ is generated by slots which are transverse to the eccentric displacement of the slot disc, or because the slot generating $T_2$ is of the correct width and/or has its leading edge correctly placed for radial angle, while the slot generating $T_2$ does not.

Likewise, a pulse with an incorrect interval (shown with a dotted line) is produced in the trigger pulse wave Gf (=Cf+Df+Ef+Ff) as well, resulting in generation of an incorrect interval $t_1$ in the gate pulse H4 (FIG. 7); but $t_2$ designates a correct interval of the pulse.

The measurement of the speed of the movable part is not based on the gate pulse H1. The reason why is explained below:

The balance between a correct and incorrect interval of a pulse in the gate pulse H4 and H1 is equal, that is, $(t_1-t_2)=$ ($T_1-T_2$), and in each interval of a correct and incorrect pulse in the gate pulse H1 and H4 (i.e., $t_1$, $t_2$, $T_1$, and $T_2$), t1 is less than $T_1$ ($t_1<T_1$) and t2 is less than $T_2$ ($t_2<T_2$). Accordingly, the ratio $(t_1-t_2)/t_1$ is more than the ratio $(T_1-T_2)/T_1$. Therefore a speed measurement based on the gate pulses H4 will cause more error than a speed measurement based on the gate pulses H1.

However, in the present invention measurement of the position of the movable part is based not on the gate pulse H1 but on the trigger pulses Gf (or Gr). To understand the reason, consider how the position of the actuators 31 is measured by the way that MPU 4 calculates moved distance: according to information from the counter (third counter 19, fourth counter 20) and information, which the ROM 5 stores, giving the moved distance of the actuators 31 per clock pulse. The trigger pulse Gf (Gr), with a narrow pulse internal, is preferable to measuring accurately the position of the actuators 31. And because the error pulses are generated repeatedly at the same interval, the error pulses do not cause such serious problems on the position control of the actuators 31.

The present invention also includes trigger pulses having pulses two times the encoder pulse frequency, as well as trigger having a frequency four times that of the encoder pulse wave frequency as described above. Trigger pulses with doubled rather than quadrupled frequency can be made by combining the C and E waves, or by combining the D and F waves. A frequency two times the encoder pulse frequency are suitable for cases requiring less accurate speed measurement but faster response. Doubled frequency is a compromise between the conventional method and the quadrupled frequency trigger pulses of the present invention as described above. The doubled-frequency trigger pulses can be implemented with programmable logic devices, latches, counters, or a basic clock generator included in MPU 4 and operated with software.

As mentioned above, the present invention a novel method and device detecting the position and speed of actuators, which is capable of elevated accuracy in detecting the speed and position of actuators by using the trigger pulse waves from an AND logic and gate pulse waves from an OR logic and an AND logic circuit, instead of the pulses waves generated by the encoder.

Here, and in the following claims, "means for calculating a motion" includes any and all electronic, mechanical, electromechanical, and other types of devices, including a microprocessor or digital computer, an analog computer, and so on.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . ." and "means for . . ." as may be found in the specification above and/or in the claims below, followed by a functional statement, are intended to define and cover whatever structural, physical, chemical or electrical element or structure may now or in the future exist carries out the recited function, whether or not precisely equivalent to the embodiment or embodiments disclosed in the specification above; and it is intended that such expressions be given their broadest interpretation.

What is claimed is:

1. A device for an injection molding machine, the device detecting a displacement and a speed of a movable injection-molding part moved by an actuator (31) of the injection molding machine; the device comprising:

(a) an encoder (3), coupled to the injection-molding part and generating, upon a motion of the injection-molding part, two pulse waves (A,B) each having a common pulse frequency, the two pulse waves being out of phase by approximately a quarter cycle;

(b) a pulse treatment section (14,15), coupled to the encoder, producing subdivided trigger pulses (Gf, Gr) having a trigger pulse frequency being a multiple of the common pulse frequency;

(c) a basic clock generator producing basic clock pulses;

(d) a first counter (19,20), coupled to the pulse treatment section, counting the trigger pulses from the pulse treatment section;

(e) a latch (17,18), coupled to the pulse treatment section, latching the trigger pulses from the pulse treatment section;

(f) a second counter (21, 22), coupled to the latch and the basic clock generator, counting the basic clock pulses during a latched interval between the trigger pulses;

(g) a controller coupled to the actuator and the encoder, the controller including
      a speed calculator dividing a clock count from the second counter by the latched interval and comprising means to obtain a speed of the injection-molding part from a quotient thereof; and
      a displacement calculator comprising means to obtain a displacement of the injection-molding part from a trigger count of trigger pulses input to the displacement calculator from the first counter.

2. The device according to claim 1, wherein the pulse treatment section includes:
   a positive programmable logic section for generating the trigger pulses due to AND logic and OR logic only while the encoder is positively rotating; and
   a negative programmable logic section for generating trigger pulses due to AND logic and OR logic only while the encoder is negatively rotating.

3. The device according to claim 1, wherein the latch includes:
   a first latch which latches trigger pulses due to AND logic produced by the positive programmable logic section to produce gate pulses; and
   a second latch which latches trigger pulses due to AND logic produced by the negative programmable logic section to produce gate pulses.

4. The device according to claim 1, wherein the counter for counting the numbers of subdivided pulses includes:
   a third counter for counting the trigger pulses due to an OR logic produced by the positive programmable logic section; and
   a fourth counter for counting the trigger pulses due to an OR logic produced by the negative programmable logic section.

5. The device according to claim 4, wherein the controller includes an MPU which calculates the speed due to signals transmitted from the first or the second counter and the ROM and also calculates the displacement due to the signals transmitted from the third counter or the fourth counter.

6. A device for an injection molding machine, the device detecting a displacement and a speed of a movable injection-molding part; the device comprising:

(a) an encoder (3), coupled to the injection-molding part and generating, upon a motion of the injection-molding part, two pulse waves (A,B) each having a common pulse frequency, the two pulse waves being out of phase by approximately a quarter cycle;

(b) a pulse treatment section coupled to the encoder and producing trigger pulses (Gf, Gr) having a trigger pulse frequency four times the common pulse frequency;

(c) a basic clock generator producing basic clock pulses; and (d) calculating means, coupled to the clock generator and the pulse treatment section, for calculating a motion of the injection-molding part from the trigger pulses and the clock pulses;

wherein the motion includes a velocity and the calculating means includes means to distinguish a forward velocity from a rearward velocity.

7. The device according to claim 6, wherein the calculated motion includes a velocity and a position.

8. The device according to claim 6, wherein the means to distinguish the forward velocity from the rearward velocity distinguishes according to which one of the two pulse waves, which are out of phase, is leading another one of the two pulse waves.

9. The device according to claim 8, wherein the means to distinguish the forward velocity from the rearward velocity comprises means for the pulse-treatment section comprises: a positive section outputting a first set of the trigger pulses (Gf) during the forward velocity and no trigger pulses during the rearward velocity; and a negative section outputting a second set of the trigger pulses (Gr) during the rearward velocity and no trigger pulses during the forward velocity.

10. A method for detecting a displacement and a speed of a movable injection-molding part of an injection molding machine, the method comprising:

providing an encoder (3);

coupling the encoder to the injection-molding part;

generating, upon a motion of the injection-molding part, two pulse waves (A,B) each having a common pulse frequency, the two pulse waves being out of phase by approximately a quarter cycle;

providing a pulse treatment section;

coupling the pulse treatment section to the encoder and producing therewith trigger pulses (Gf, Gr) having a trigger pulse frequency four times the common pulse frequency;

providing a basic clock generator producing basic clock pulses; and providing a calculating means coupled to the clock generator and the pulse treatment section;

calculating a motion of the injection-molding part from the trigger pulses and the clock pulses.

* * * * *